US012397988B2

(12) United States Patent
Peek et al.

(10) Patent No.: US 12,397,988 B2
(45) Date of Patent: Aug. 26, 2025

(54) REAR LOADING REFUSE VEHICLE WITH A MODULAR PACKER

(71) Applicant: The Heil Co., Chattanooga, TN (US)

(72) Inventors: Michael Shane Peek, Pisgah, AL (US); Mark Fraas, Centre, AL (US); Tapankumar Pandya, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 215 days.

(21) Appl. No.: 17/939,436

(22) Filed: Sep. 7, 2022

(65) Prior Publication Data

US 2023/0076113 A1 Mar. 9, 2023

Related U.S. Application Data

(60) Provisional application No. 63/261,009, filed on Sep. 8, 2021.

(51) Int. Cl.
*B65F 3/28* (2006.01)
*B65F 3/20* (2006.01)

(52) U.S. Cl.
CPC . *B65F 3/28* (2013.01); *B65F 3/20* (2013.01)

(58) Field of Classification Search
CPC ........ B65F 3/28; B65F 3/20; B65F 2003/006; B65F 3/14; B65F 3/208
See application file for complete search history.

(56) References Cited

U.S. PATENT DOCUMENTS

| | | | | | |
|---|---|---|---|---|---|
| 3,559,825 | A * | 2/1971 | Meyer | B65F 3/20 | 100/98 R |
| 5,562,390 | A * | 10/1996 | Christenson | B60P 1/20 | 414/408 |
| 5,779,300 | A * | 7/1998 | McNeilus | B65F 3/00 | 296/183.1 |
| 2001/0005477 | A1* | 6/2001 | Smith | B65F 3/20 | 414/525.51 |

* cited by examiner

*Primary Examiner* — Jonathan Snelting
(74) *Attorney, Agent, or Firm* — Fish & Richardson P.C.

(57) ABSTRACT

A rear loading refuse vehicle includes a tailgate coupled to a rearward end of the body. The tailgate includes a modular refuse packing assembly removably mounted therein and configured to compact refuse received in a hopper into a storage chamber located in the body. The modular refuse packing assembly may include a frame supporting an actuator and a blade. The frame is removably coupled to the tailgate. The actuator is configured to move the blade between extended and retracted positions and thereby compact the refuse received in the hopper.

13 Claims, 4 Drawing Sheets

REAR LOADING REFUSE VEHICLE WITH A MODULAR PACKER

CROSS-REFERENCE TO RELATED APPLICATIONS

This application claims the benefit under 35 U.S.C. § 119(e) of U.S. Patent Application No. 63/261,009, entitled "Rear Loading Refuse Vehicle With A Modular Packer," filed Sep. 8, 2021, which is incorporated herein by reference in its entirety.

TECHNICAL FIELD

Disclosed embodiments relate generally to refuse collection vehicles and more particularly to a rear loading refuse vehicle with a modular refuse packing assembly.

BACKGROUND

Refuse vehicles have long serviced homes and businesses in urban, residential, and rural areas. Collected waste is commonly transported to a landfill, an incinerator, a recycling plant, or some other facility. After collection in a hopper (e.g., located in the tailgate of a rear loading vehicle), the waste is generally compacted into a storage chamber in the body of the vehicle. Such compaction reduces the volume of the refuse and increases the carrying capacity of the vehicle. In rear loading refuse vehicles, the packing mechanism is built into the tailgate and is commonly configured to draw the refuse up out of the hopper and compact it towards the front of the vehicle.

While such refuse vehicles have long been serviceable, there is a need for further improvements. As currently configured, the refuse compacting mechanism is built into the tailgate such that it can only be assembled and/or serviced at the part level. Servicing the mechanism commonly requires disassembling (and then reassembling) a number of individual components inside the tailgate. This process is time consuming (often sidelining a vehicle for days or even weeks for a minor repair) and presents a safety hazard to service technicians required to work in the confines of the tailgate structure. There is a need for a rear loading refuse vehicle with an improved tailgate assembly and in particular a tailgate assembly that addresses the above described drawbacks.

SUMMARY

A refuse vehicle body includes a tailgate coupled to a rearward end of the body and configured to move between a closed position and an open position. The body includes a modular refuse packing assembly removably mounted to the tailgate and configured to compact refuse received in a hopper into a storage chamber located in the body. In one embodiment, the modular refuse packing assembly includes a frame supporting an actuator and a blade. The frame is removably coupled to the tailgate. The actuator is configured to move the blade between extended and retracted positions and thereby compact the refuse received in the hopper.

One aspect of the present disclosure features a refuse vehicle body configured for deployment on a vehicle chassis. The body includes a refuse storage chamber; a tailgate on a rear end of the body and configured to move between a closed position and an open position, the tailgate including a hopper configured to receive refuse; a modular refuse packing assembly in the tailgate and configured to compact refuse received in the hopper into the storage chamber; the modular refuse packing assembly including a frame supporting an actuator and a blade, the frame removably coupled to the tailgate, the actuator configured to move the blade and thereby compact the refuse received in the hopper.

Embodiments may include one or more of the following features.

In some embodiments, the modular refuse packing assembly is configured to be removed from the tailgate as a unitary whole.

In some embodiments, the frame is configured to transfer actuation forces to the tailgate when the actuator causes the blade to compact the refuse received in the hopper.

In some embodiments, the frame is bolted or pinned to the tailgate.

In some embodiments, the frame includes a plurality of plates mechanically coupled with and supported by a plurality of tubular support members; the tubular support members are bolted or pinned to the tailgate; and the actuator is rotatably coupled to one of the plates.

In some embodiments, the hopper is located in a lower portion of the tailgate and the modular refuse packing assembly is located above the hopper.

In some embodiments, the actuator includes a linear electrical actuator.

In some embodiments, the modular refuse packing assembly further includes an electrical connector configured to couple with a corresponding connector located in the tailgate.

In some embodiments, the actuator includes a hydraulic piston.

In some embodiments, the modular refuse packing assembly further includes a hydraulic fluid connector configured to couple with a corresponding connector located in the tailgate.

In some embodiments, the modular refuse packing assembly further includes a slide panel, a lower end of the slide panel being rotationally coupled with an upper end of the blade.

In some embodiments, the modular refuse packing assembly includes at least first and second actuators, the first actuator rotationally coupled a lower end of the blade and the second actuator rotationally coupled to an upper end of the blade.

In some embodiments, the frame includes first and second plates coupled with and supported by first, second, and third tubular support members; at least the first and second tubular support members are bolted or pinned to the tailgate; the first actuator is rotationally coupled with the first plate proximate the first tubular support member; the second actuator is rotationally coupled with the first plate proximate the second tubular support member; a first linkage is rotationally coupled with both the first plate and the upper end of the blade; and a second linkage is rotationally coupled with both the first plate and an upper end of the slide panel.

In some embodiments, the modular refuse packing assembly includes first and second pairs of the first and second actuators deployed on opposing sides of the modular refuse packing assembly.

In some embodiments, the refuse vehicle further includes an ejector movable in the body and configured eject refuse from the storage chamber when the tailgate is in the open position.

Another aspect of the present disclosure features a refuse vehicle including a chassis; and any refuse vehicle body disclosed herein on the chassis.

Yet another aspect of the present disclosure features a method for servicing a refuse vehicle, the method including providing any of the refuse vehicles disclosed herein; decoupling the modular refuse packing assembly from the tailgate; removing the modular refuse packing assembly from the tailgate; servicing the modular refuse packing assembly; deploying said serviced modular refuse packing assembly in the tailgate of the refuse vehicle or in a tailgate of a different refuse vehicle; and coupling the serviced modular refuse packing assembly to the tailgate.

Another aspect of the present disclosure features a method for servicing a refuse vehicle, the method including providing any of the refuse vehicles of the disclosure; decoupling the modular refuse packing assembly from the tailgate; removing the modular refuse packing assembly from the tailgate; deploying a different modular refuse packing assembly in the tailgate; and coupling the serviced modular refuse packing assembly to the tailgate.

This summary is provided to introduce a selection of concepts that are further described below in the detailed description. This summary is not intended to identify key or essential features of the claimed subject matter, nor is it intended to be used as an aid in limiting the scope of the claimed subject matter.

The details of one or more embodiments of the invention are set forth in the accompanying drawings and the description below. Other features, objects, and advantages of the invention will be apparent from the description, the drawings, and the claims.

BRIEF DESCRIPTION OF THE DRAWINGS

For a more complete understanding of the disclosed subject matter, and advantages thereof, reference is now made to the following descriptions taken in conjunction with the accompanying drawings, in which.

Like reference symbols in the various drawings indicate like elements.

DETAILED DESCRIPTION

Rear loading refuse vehicles are disclosed. Example refuse vehicles include a refuse vehicle body deployed on a vehicle chassis. The vehicle body includes storage chamber and a tailgate configured to move between closed and open positions. The tailgate includes a hopper and a modular refuse packing assembly configured to compact refuse received in the hopper into the storage chamber. In one embodiment, the modular refuse packing assembly includes a frame supporting an actuator and a blade. The frame is removably coupled to (or mounted on) the tailgate (e.g., removably coupled to the tailgate weldment). The actuator is configured to move the blade between extended and retracted positions and thereby compact the refuse received in the hopper.

The disclosed embodiments may advantageously provide a refuse vehicle, refuse vehicle body, and/or rear loading refuse vehicle tailgate in which the refuse packing assembly is modular to the tailgate. By modular it is meant that the packing assembly is substantially fully assembled outside of the tailgate prior to deployment in and coupling with the tailgate. Such modularity may advantageously improve access for assembly and surface treatment (e.g., painting). Such modularity may further improve the serviceability of the refuse packing assembly. For example, a malfunctioning refuse packing assembly may be removed from the vehicle tailgate and immediately replaced with a spare module thereby significantly reducing the overall unit downtime. The malfunctioning refuse packing assembly may then be repaired separate from the vehicle (and without removing the vehicle from service).

It will be appreciated that use of a modular refuse packing assembly may further improve safety. In particular, a modular assembly obviates the need for service personnel to work in the confines and sometimes contaminated environment of the tailgate structure. Moreover, removing the modular from the tailgate may reduce overall service time by providing easier access to assembly components.

The disclosed refuse vehicle tailgate structure may be further advantageous in that refuse packing assembly may be readily updated or swapped out with improved models or modules including different or updated functionality. For example, the modular packing assembly may be swapped out with a chipper or mulcher for spring and fall collections or with a shredder or other compaction assembly configured for recyclables.

Figure 1:
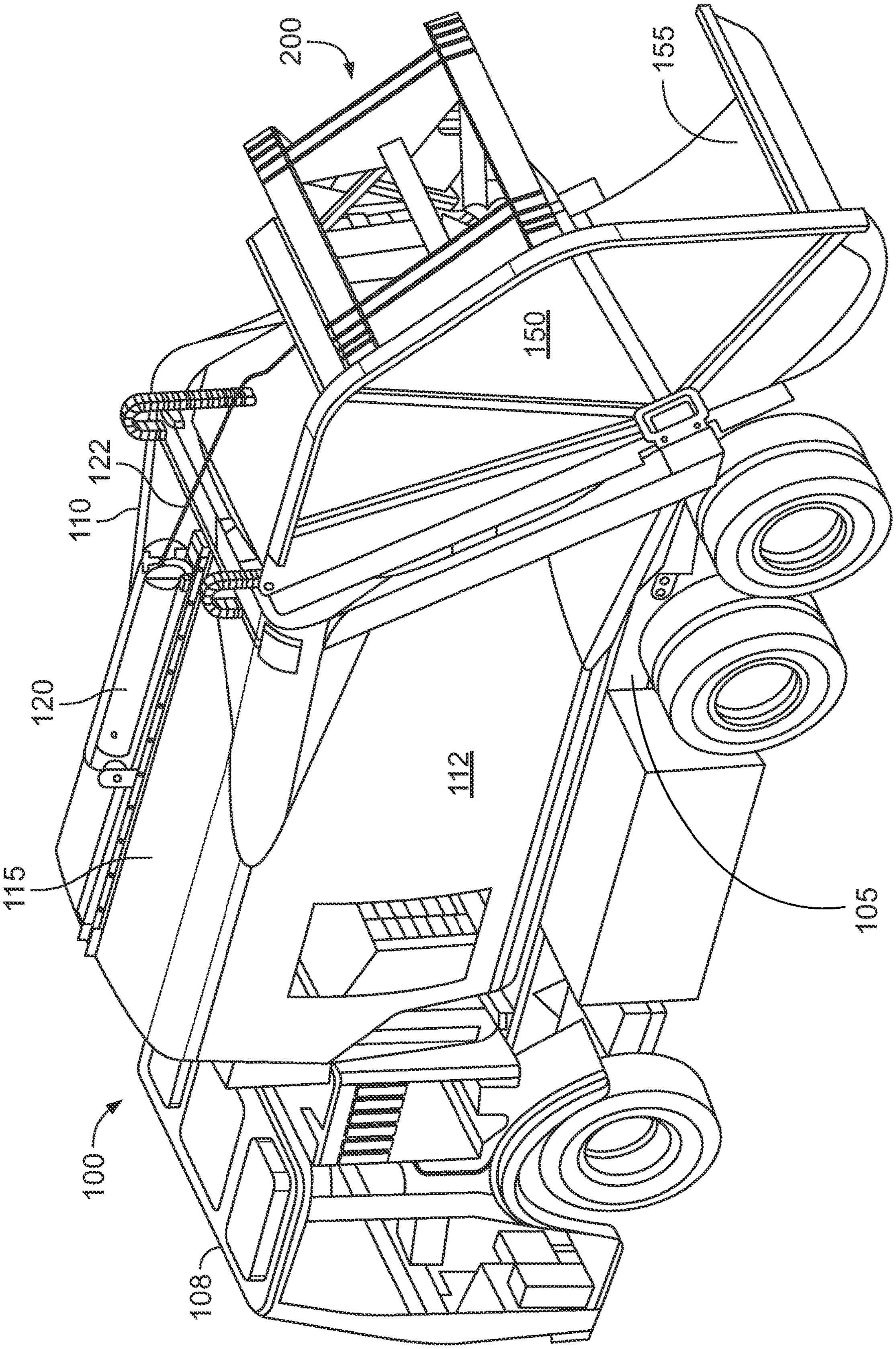
FIG. 1 depicts an example refuse vehicle employing the disclosed modular refuse packing assembly.

FIG. 1 depicts a partially cutaway view of an example rear loading refuse vehicle 100 employing a disclosed modular refuse packing assembly 200. The depicted refuse vehicle 100 includes a vehicle body 110 and a cab 108 deployed on a chassis (or frame) 105. The vehicle body 110 includes (or houses) a refuse storage chamber 112 configured to receive and store compacted refuse for transfer. A rear loading tailgate 150 is deployed on a rearward facing end of the vehicle body 110 and is configured to open and close the refuse storage chamber 112 to the outside world. The rear loading tailgate 150 includes a hopper 155 on a lower end thereof. The hopper 155 is configured to receive refuse, for example, via manual loading or a hydraulically or electrically actuated rear loader assembly (not shown).

While not depicted on FIG. 1, it will be understood that the rear loading tailgate 150 may be rotationally coupled to the vehicle body such that it rotates with or about a hinge or pin between the open and closed positions. For example, the rear loading tailgate 150 may be rotationally fixed to a shaft via tailgate brackets. For example, the tailgate brackets may be welded and/or bolted to both the rear loading tailgate 150 and the shaft (which is in turn configured to rotate with respect to the body). The disclosed embodiments are, of course, not limited to any particular tailgate open and close mechanism.

In the depicted embodiment an electrical actuator 120 (e.g., an electrically powered winch) is deployed on the roof 115 of the vehicle body 110. The electrical actuator 120 is configured to rotate the rear loading tailgate 150 between the open and closed positions via drawing and releasing cable 122. It will be understood that the disclosed embodiments are not limited to any particular tailgate actuation mechanism. For example, alternative embodiments may utilize conventional hydraulic pistons deployed on either the tailgate or the body to open and close the tailgate.

It will be understood that in the disclosed embodiments, the vehicle may optionally include a tailgate locking mechanism to lock the tailgate in the closed position. The locking mechanism may be advantageously configured to secure the rear loading tailgate 150 in the closed position such that it can withstand compaction forces imparted by the modular refuse packing assembly 200 against an ejector panel and/or compacted refuse in the storage chamber 112.

The optional locking mechanism may include substantially any suitable mechanism. For example, the locking mechanism may include a manual locking mechanism including a threaded member or a pin deployed on the body (or tailgate) that engages a corresponding aperture on the tailgate (or body). The locking mechanism may alternatively include a powered mechanism in which a pin, screw, or bar engages a corresponding aperture or slot. Such mechanisms may be powered, for example, via hydraulic, electric, or pneumatic power and may be advantageously controlled from the cab.

Figure 2:
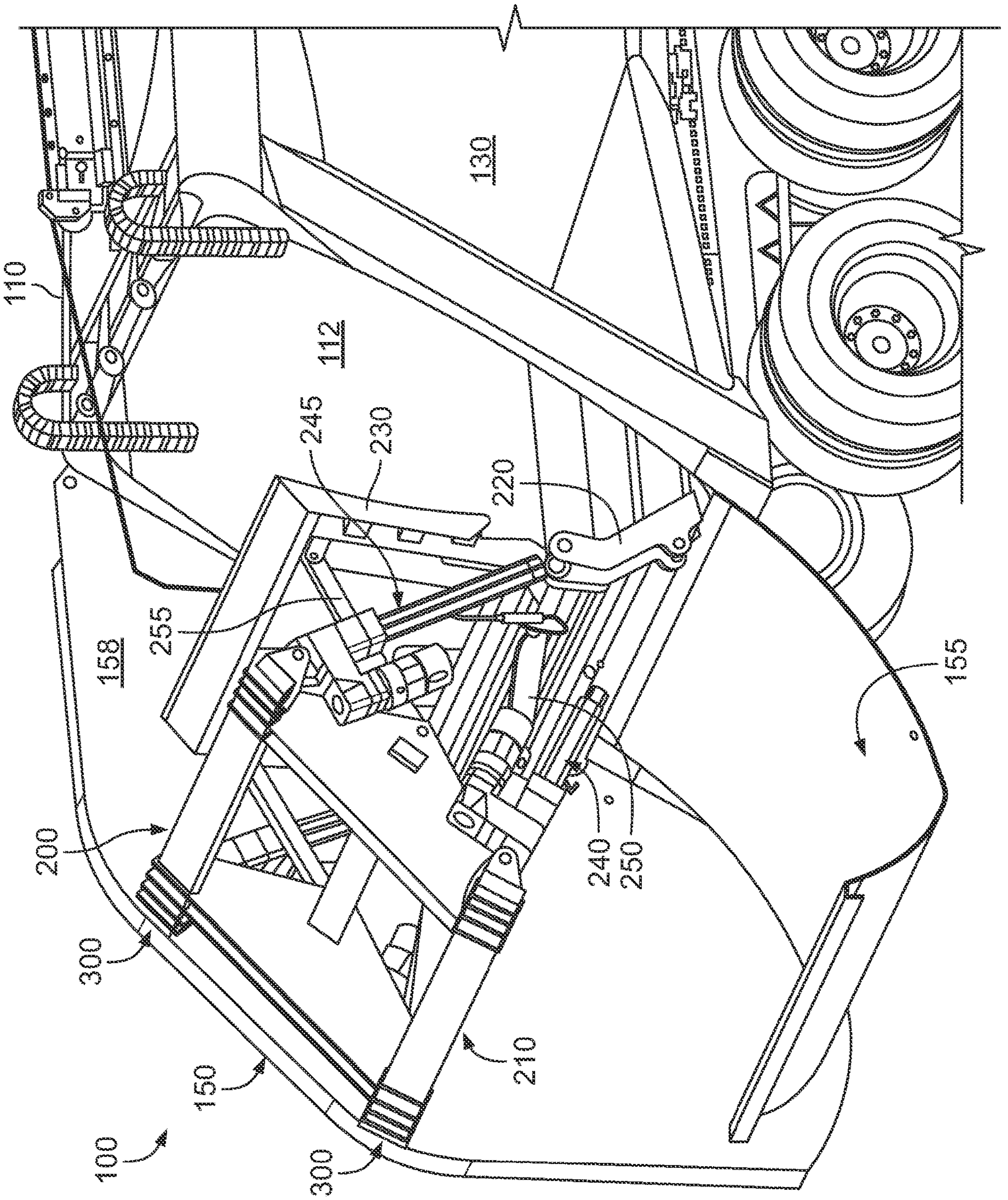
FIG. 2 depicts a partially cutaway view of the tailgate structure of the example refuse vehicle depicted on FIG. 1 with the modular refuse packing assembly deployed in and mounted to the tailgate.

Turning now to FIG. 2, a partially cutaway view of the tailgate structure of refuse vehicle 100 is depicted. As described above with respect to FIG. 1, rear loading tailgate 150 includes a modular refuse packing assembly 200 deployed in and removably coupled to the rear loading tailgate 150. The modular refuse packing assembly 200 may be removably coupled (e.g., botted) to the rear loading tailgate 150, for example, at 300. Such coupling is intended to rigidly secure the modular refuse packing assembly 200 to the tailgate (e.g., to the side weldment 158 as depicted). Moreover the coupling is advantageously configured (e.g., of sufficient size and strength) to provide a secure connection and enable load transfer from the modular refuse packing assembly 200 to the rear loading tailgate 150 during refuse compaction (e.g., as the refuse is compacted against ejector 130 in vehicle body 110).

Figure 3:
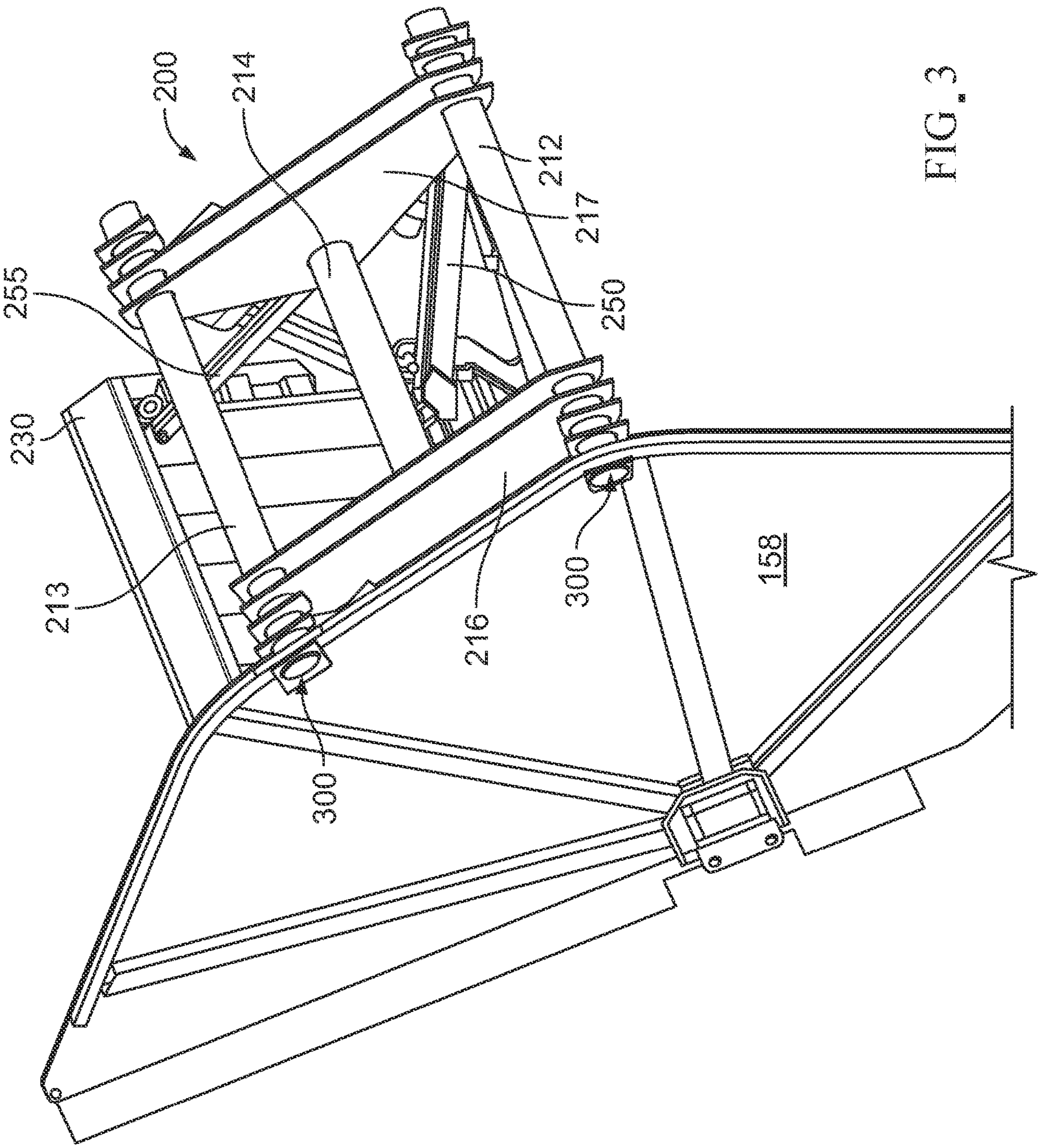
FIG. 3 depicts the modular refuse packing assembly mounted to the left-side tailgate weldment structure of the refuse vehicle depicted on FIG. 1.
Figure 4:
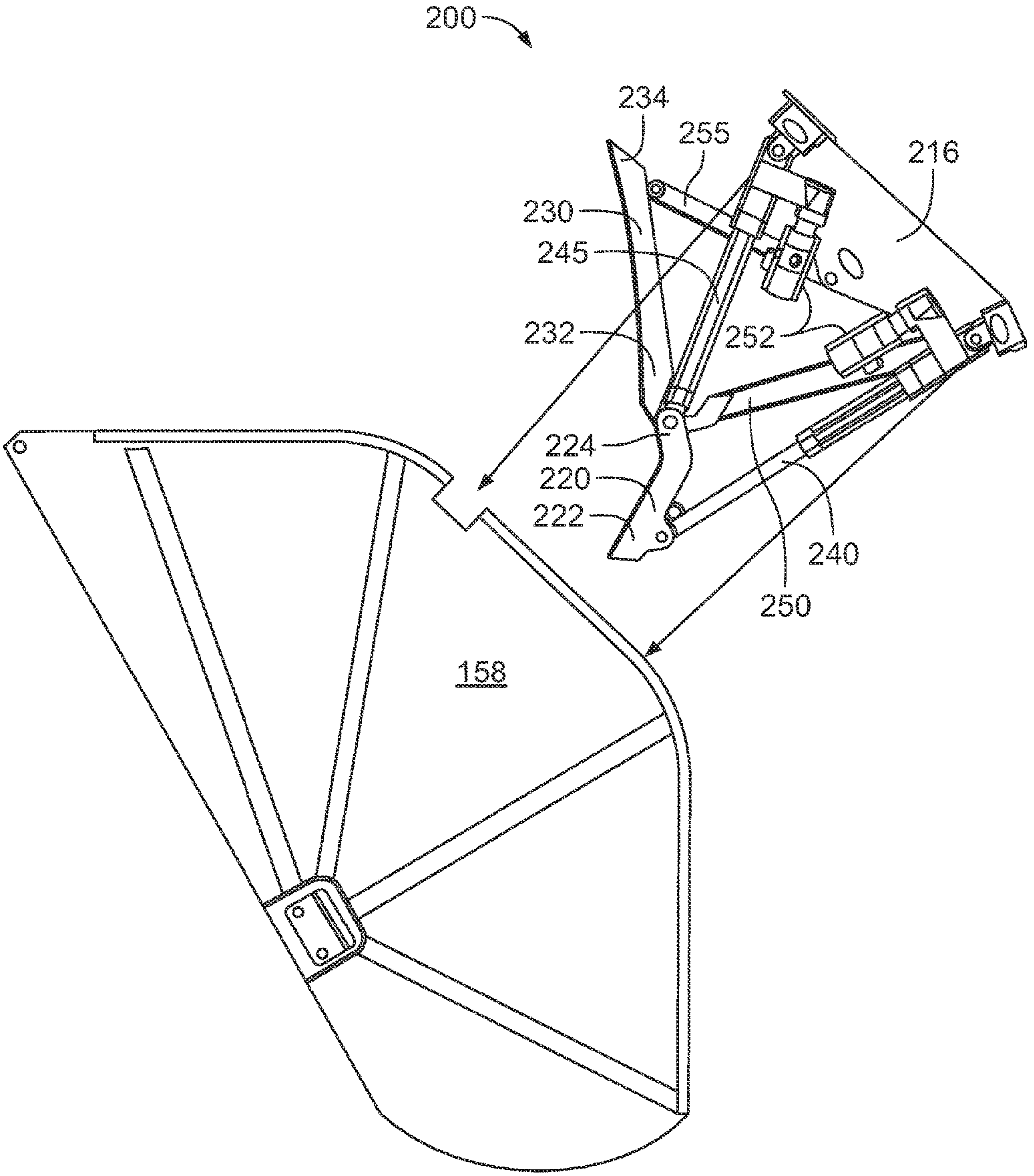
FIG. 4 depicts the modular refuse packing assembly dismounted from the left-side tailgate weldment structure shown on FIG. 3.

With continued reference to FIG. 2, and further reference to FIGS. 3 and 4, modular refuse packing assembly 200 is configured as a stand-alone structure and is configured to be deployed in and removed from the tailgate 150 as a unitary whole (see FIG. 4). The unit may be removed from the rear loading tailgate 150, for example, for servicing or repair and may be swapped out with a similar or different assembly. In the depicted embodiment the modular refuse packing assembly 200 is deployed above the hopper 155 and includes a frame 210 configured to support a blade 220 and a slide panel 230 each of which is sized and shaped for compacting refuse received in the hopper 155 into the storage chamber 112. The modular refuse packing assembly 200 further includes a first actuator 240 and a second actuator 245 rotatably coupling the frame 210 and the blade 220. These actuators may be pinned, for example, to the frame 210 and blade 220 as depicted. The modular assembly still further includes first and second linkages 250, 255 rotatably coupling the slide panel 230 and blade 220 with the frame 210. The first linkage 250 may be an upper linkage, and the second linkage 255 may be a lower linkage.

The frame 210 may include substantially any suitable support structure configured to support the blade 220 and slide panel 230 as well as the corresponding first and second actuators 240, 245 and first and second linkages 250, 255. In the depicted embodiment, the frame includes first, second, and third cross tubulars 212, 213, 214 supporting a plurality of plates 216, 217. The cross tubulars are deployed in a substantially orthogonal direction to a longitudinal axis of the vehicle. The first and second cross tubulars 212, 213 may be removably coupled to the rear loading tailgate 150 at opposing ends thereof (as depicted schematically at 300). The plates 216, 217 may be deployed, for example, on opposing sides (left side and right side) of the modular refuse packing assembly 200 and may include multiple plates on each side of the modular refuse packing assembly 200 (e.g., as depicted on FIG. 3). The plates 216, 217 may be coupled (e.g., welded) to the cross tubulars 212, 213, 214 and are configured (e.g., sized and shaped) to support the first and second actuators 240, 245 and first and second linkages 250, 255 and the corresponding loads imparted thereby during a compaction operation.

The first and second actuators 240, 245 may include substantially any suitable linear actuators, for example, including hydraulic pistons or electrically powered linear actuators. In embodiments including hydraulic actuators, the modular refuse packing assembly 200 may further include a hydraulic connector (e.g., a hydraulic quick connect) configured to connect with hydraulic power in the tailgate. In embodiments including electric actuators, the modular refuse packing assembly 200 may further include an electrical connector configured to connect to an electrical power source. Each electrically powered actuator may include a corresponding electrical motor 252. Moreover, embodiments employing electrically powered actuators may further include optional motor brakes that may be engaged to secure the blade 220 and the slide panel 230 in the fully compacted positions (e.g., after a compaction operation). Substantially any suitable motor brake may be employed, for example, including a direct current (DC) spring set brake, an electrically set brake, or a permanent magnet set brake.

In the depicted embodiment, the first actuator 240 is rotatably coupled (e.g., pinned) with a lower portion 222 of the blade 220 and one of the plates 216, 217 (e.g., a lower back end of the plate proximate to the first cross tubular 212 as depicted on FIG. 2). The second actuator 245 is rotatably coupled (e.g., pinned) with an upper portion 224 of the blade 220 and one of the plates 216, 217 (e.g., an upper front end of the plate proximate to the second cross tubular 213 as depicted on FIG. 2). In FIGS. 2-4 the modular refuse packing assembly 200 is depicted in a compacting (fully compacted) configuration with the first actuator 240 extended and the second actuator 245 retracted. To remove refuse received in the hopper 155, the first actuator 240 is substantially fully retracted and the second actuator 245 is substantially fully extended thereby rotating the blade 220 towards the rear of the hopper 155. The first actuator 240 is then extended and the second actuator retracted to compact the refuse received in the hopper 155 into the storage chamber 112.

As depicted on FIGS. 2 and 4, the slide panel 230 and the blade 220 may be rotatably coupled (e.g., hinged or pinned) to one another. In the depicted embodiment, a lower portion 232 of the slide panel 230 is hinged to the upper portion 224 of the blade 220. The modular refuse packing assembly 200 further includes a first linkage 250 rotatably coupled to the upper portion 224 of the blade 220 and plate 216. A second linkage 255 is rotatably coupled to an upper portion 234 of the slide panel 230 and plate 216.

It will be appreciated that modular refuse packing assembly 200 may include symmetric pairs of first and second actuators and upper and lower linkages deployed on opposing sides (e.g., the left side and right side) of the modular refuse packing assembly 200 (e.g., corresponding to the left side and the right side of the vehicle). For example, in the depicted embodiment, modular refuse packing assembly 200 includes first and second actuators 240, 245 and first and second linkages 250, 255 rotatably coupled to plate 216 and a left side of the blade 220 and slide panel 230 and corresponding first and second actuators 240, 245 and first and second linkages 250, 255 rotatably coupled to plate 217 and a right side of the blade 220 and slide panel 230. It will, of course, be understood that the disclosed embodiments are not limited in this regard.

With continued reference to FIGS. 2-4, and as described above, the modular refuse packing assembly 200 may be removed from the tailgate 150 as a unitary whole (as depicted on FIG. 4). It will be appreciated that no disassembly of the modular refuse packing assembly 200 is required. For example, in certain embodiment the bolts or pins securing the frame 210 to the rear loading tailgate 150 (e.g., at 300) may be removed. Electrical or hydraulic connectors (not depicted) (connecting the actuators with vehicle power) may be disconnected either before or during the removal process. The modular refuse packing assembly 200 may then be hoisted up and out of the rear loading tailgate 150. For example, the modular refuse packing assembly 200 may be lifted via one or more of the tubulars 212, 213, 214. In one example embodiment one or more of the tubulars may include structures (e.g., hooks or eyes) for connecting hoisting straps or chains to hoist the modular refuse packing assembly 200. Upon removing the modular refuse packing assembly 200 from the rear loading tailgate 150 it may be lowered, for example, to a shop floor for future maintenance or repair. The depicted assembly embodiment may be advantageously lowered with the blade 220 and slide panel 230 face down on the floor.

Although embodiments of a modular refuse packing assembly for a rear loading refuse vehicle have been described in detail, it should be understood that various changes, substitutions and alternations can be made herein without departing from the spirit and scope of the disclosure as defined by the appended claims.

The invention claimed is:

1. A refuse vehicle body comprising:
- a refuse storage chamber;
- a tailgate on a rear end of the refuse vehicle body and configured to move between a closed position and an open position, the tailgate including a hopper configured to receive refuse;
- a modular refuse packing assembly in the tailgate and configured to compact refuse received in the hopper into the refuse storage chamber, the modular refuse packing assembly comprising:
- a blade;
- a slide panel comprising a lower end that is rotationally coupled with an upper end of the blade;
- actuators configured to move the blade and thereby compact the refuse received in the hopper, the actuators comprising:
  - a first actuator rotationally coupled to a lower end of the blade; and
  - a second actuator rotationally coupled to the upper end of the blade;
- a frame supporting the blade, the slide panel, and the actuators, the frame removably coupled to the tailgate, the frame comprising first and second plates coupled with and supported by first, second, and third tubular support members, wherein:
  - at least the first and second tubular support members are bolted or pinned to the tailgate;
  - the first actuator is rotationally coupled with the first plate proximate the first tubular support member;
  - the second actuator is rotationally coupled with the first plate proximate the second tubular support member;
  - a first linkage is rotationally coupled with both the first plate and the upper end of the blade; and
  - a second linkage is rotationally coupled with both the first plate and an upper end of the slide panel.

2. The refuse vehicle body of claim 1, wherein the modular refuse packing assembly is configured to be removed from the tailgate as a unitary whole.

3. The refuse vehicle body of claim 1, wherein the frame is configured to transfer actuation forces to the tailgate when the actuator causes actuators cause the blade to compact the refuse received in the hopper.

4. The refuse vehicle body of claim 1, wherein the hopper is located in a lower portion of the tailgate and the modular refuse packing assembly is located above the hopper.

5. The refuse vehicle body of claim 1, wherein actuators comprise a linear electrical actuator.

6. The refuse vehicle body of claim 5, wherein the modular refuse packing assembly further comprises an electrical connector configured to couple with a corresponding connector located in the tailgate.

7. The refuse vehicle body of claim 1, wherein the actuators comprise a hydraulic piston.

8. The refuse vehicle body of claim 7, wherein the modular refuse packing assembly further comprises a hydraulic fluid connector configured to couple with a corresponding connector located in the tailgate.

9. The refuse vehicle body of claim 1, wherein the modular refuse packing assembly comprises first and second pairs of the first and second actuators deployed on opposing sides of the modular refuse packing assembly.

10. The refuse vehicle body of claim 1, further comprising an ejector movable in the refuse vehicle body and configured eject refuse from the refuse storage chamber when the tailgate is in the open position.

11. The refuse vehicle body of claim 1, mounted to a refuse vehicle chassis.

12. A method for servicing a refuse vehicle, the method comprising:
- providing a refuse vehicle comprising:
  - a refuse vehicle chassis,
  - the refuse vehicle body of claim 1 mounted to the refuse vehicle chassis, and
  - a cab coupled to a forward portion of the refuse vehicle chassis;
- decoupling the modular refuse packing assembly from the tailgate;
- removing the modular refuse packing assembly from the tailgate;
- servicing the modular refuse packing assembly;
- deploying said serviced modular refuse packing assembly in the tailgate of the refuse vehicle or in a tailgate of a different refuse vehicle; and
- coupling the serviced modular refuse packing assembly to the tailgate.

13. A method for servicing a refuse vehicle, the method comprising:
- providing a refuse vehicle comprising:
  - a refuse vehicle chassis,
  - the refuse vehicle body of claim 1 mounted to the refuse vehicle chassis, and
  - a cab coupled to a forward portion of the refuse vehicle chassis;
- decoupling the modular refuse packing assembly from the tailgate;
- removing the modular refuse packing assembly from the tailgate;

deploying a different modular refuse packing assembly in the tailgate; and coupling the modular refuse packing assembly to the tailgate.

* * * * *